US012771818B2

(12) United States Patent
Lundgren et al.

(10) Patent No.: US 12,771,818 B2
(45) Date of Patent: Oct. 20, 2026

(54) METHOD AND SYSTEM FOR PARAMETER OPTIMIZATION BASED ON METADATA OF PRESCRIPTION LENS INSERTS

(71) Applicant: Varjo Technologies Oy, Helsinki (FI)

(72) Inventors: Mika-Petteri Lundgren, Salo (FI); Evgeny Shirko, Espoo (FI)

(73) Assignee: Varjo Technologies Oy, Helsinki (FI)

( * ) Notice: Subject to any disclaimer, the term of this patent is extended or adjusted under 35 U.S.C. 154(b) by 9 days.

(21) Appl. No.: 18/947,681

(22) Filed: Nov. 14, 2024

(65) Prior Publication Data

US 2026/0135986 A1 May 14, 2026

(51) Int. Cl.

*H04N 13/383* (2018.01)
*H04N 13/178* (2018.01)
*H04N 13/327* (2018.01)
*H04N 13/398* (2018.01)

(52) U.S. Cl.

CPC ......... *H04N 13/383* (2018.05); *H04N 13/178* (2018.05); *H04N 13/327* (2018.05); *H04N 13/398* (2018.05)

(58) Field of Classification Search

None

See application file for complete search history.

(56) References Cited

U.S. PATENT DOCUMENTS

2018/0286070 A1* 10/2018 Benedetto ................. G06T 7/62
2019/0101980 A1* 4/2019 Stafford ................. G02C 11/10
2023/0038781 A1* 2/2023 Ryu ....................... G02C 11/10
2024/0119594 A1* 4/2024 Ben-Ami ............. A61B 3/0025
2024/0295735 A1* 9/2024 Stafford .................. G06F 3/013

* cited by examiner

*Primary Examiner* — Hung Q Dang
(74) *Attorney, Agent, or Firm* — Ziegler IP Law Group, LLC.

(57) ABSTRACT

A method includes detecting when a prescription lens is attached to a display apparatus; obtaining metadata associated with the prescription lens, upon the detection; determining whether the prescription lens belongs to a given set of prescription lenses that are pre-known to be compatible with the display apparatus, based on the obtained metadata; when it is determined that the prescription lens belongs to the given set of prescription lenses, obtaining at least one compensatory parameter corresponding to the prescription lens from a first data repository; and implementing prescription lens compensation by employing the at least one compensatory parameter, wherein the prescription lens compensation includes one or more of: processing at least one of: gaze-tracking data, extended-reality images to be displayed by the display apparatus, adjusting at least one physical setting of the display apparatus.

16 Claims, 2 Drawing Sheets

METHOD AND SYSTEM FOR PARAMETER OPTIMIZATION BASED ON METADATA OF PRESCRIPTION LENS INSERTS

TECHNICAL FIELD

The present disclosure relates to methods for parameter optimization based on metadata of prescription lens inserts. The present disclosure also relates to systems for parameter optimization based on metadata of prescription lens inserts.

BACKGROUND

Devices that provide extended-reality (XR) experiences are now being used widely, for various purposes, such as education, simulation-based training, collaborative work, and the like. Some users of these XR devices suffer from vision problems such as myopia, astigmatism, and the like, and thus generally require eyeglasses with prescription lenses to view objects around them clearly and correctly.

For such users, the integration of prescription lenses with XR devices poses a significant challenge. Firstly, most XR devices do not support wearing of the eyeglasses during use, for various reasons, such as limited space between the user's eyes and eyepieces of the XR devices, misalignment of the eyeglasses with optical elements of the XR devices, usage discomfort, and similar issues. Secondly, some XR devices support integration of prescription lenses during use, but such XR devices suffer from performance issues due to poor integration techniques. For example, in most cases, prescription lens inserts are simply dropped on top of lenses of these XR devices (i.e., introduced into an optical path between the lenses and the user's eyes), relying on none-to-small impact on optical performance and visual quality. The performance issues associated with the XR devices supporting integration of prescription lenses are manifold. For example, the prescription lenses may have various optical powers and coatings thereon, which adversely impact one or more functionalities (such as gaze-tracking) in the XR devices in a manner that such functionalities malfunction or not function at all. Furthermore, such prescription lenses may also deteriorate the visual quality of XR images such that the visual quality is worse than anticipated. As an example, the XR images may suffer from distortions, chromatic aberrations, high dynamic range (HDR) misrepresentation, and the like.

Therefore, in light of the foregoing discussion, there exists a need to overcome the aforementioned drawbacks.

SUMMARY

The present disclosure seeks to provide a method and a system that provide effective and accurate compensation for optical effects of prescription lenses when such prescription lenses are used with a display apparatus, such that a high-quality visual experience is provided to a user of the display apparatus. The aim of the present disclosure is achieved by a method and a system for parameter optimization based on metadata of prescription lens inserts, as defined in the appended independent claims to which reference is made to. Advantageous features are set out in the appended dependent claims. The embodiments of the present disclosure substantially enable to improve the visual quality and user experience by optimizing compensatory parameters based on prescription lens metadata.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
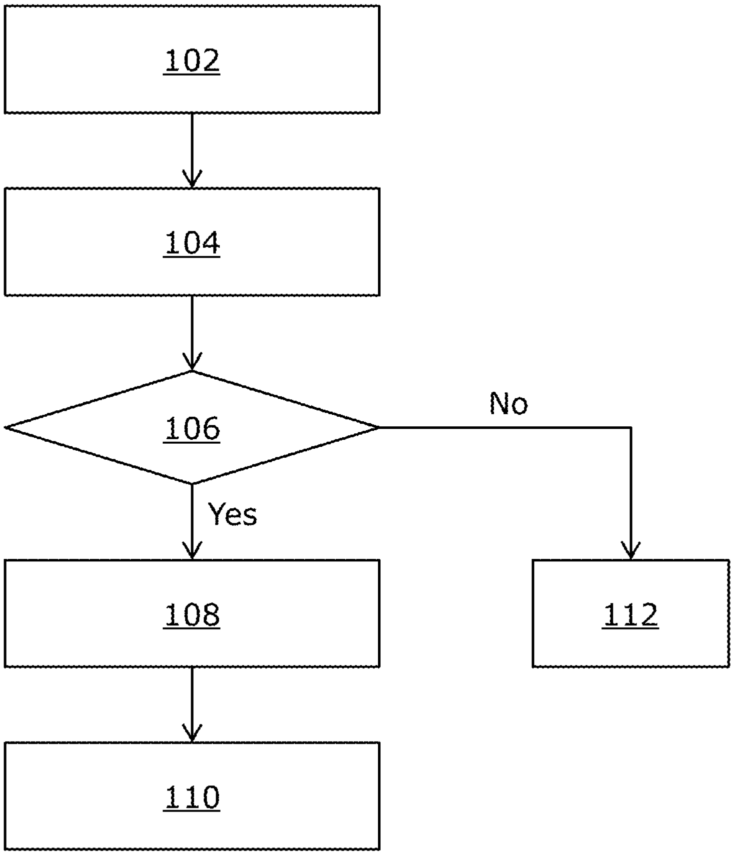
FIG. 1 illustrates steps of a method, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a method comprising:

- detecting when a prescription lens is attached to a display apparatus;
- obtaining metadata associated with the prescription lens, upon said detection;
- determining whether the prescription lens belongs to a given set of prescription lenses that are pre-known to be compatible with the display apparatus, based on the obtained metadata;
- when it is determined that the prescription lens belongs to the given set of prescription lenses, obtaining at least one compensatory parameter corresponding to the prescription lens from a first data repository; and
- implementing prescription lens compensation by employing the at least one compensatory parameter, wherein the prescription lens compensation comprises one or more of:
  - processing at least one of: gaze-tracking data, extended-reality images to be displayed by the display apparatus,
  - adjusting at least one physical setting of the display apparatus.

In a second aspect, an embodiment of the present disclosure provides a system comprising a display apparatus, wherein the display apparatus comprises:

- a gaze-tracking system; and
- at least one processor configured to:
  - detect when a prescription lens is attached to the display apparatus;
  - obtain metadata associated with the prescription lens, upon said detection;
  - determine whether the prescription lens belongs to a given set of prescription lenses that are pre-known to be compatible with the display apparatus, based on the obtained metadata;

when it is determined that the prescription lens belongs to the given set of prescription lenses, obtain at least one compensatory parameter corresponding to the prescription lens from a first data repository; and implement prescription lens compensation by employing the at least one compensatory parameter, wherein when implementing the prescription lens compensation, the at least one processor is configured to perform one or more of:

process at least one of: gaze-tracking data, extended-reality images to be displayed by the display apparatus, adjust at least one physical setting of the display apparatus.

The present disclosure relates to the aforementioned method and the aforementioned system that provide a seamless, high-quality, and an immersive extended-reality viewing experience for a user using the prescription lens with the display apparatus. The method involves automatic and accurate detection of attachment of the prescription lens to the display apparatus. Then the metadata associated with the prescription lens is obtained reliably, for beneficially enabling a quick and accurate assessment of compatibility of the prescription lens with the display apparatus. The at least one compensatory parameter corresponding to the prescription lens is obtained, since it is pre-known to provide an effective compensatory effect for undesirable adverse effects of the prescription lens on the extended-reality viewing experience. The implementation of the prescription lens compensation effectively mitigates such adverse effects, since the at least one compensatory parameter is employed in performing processing steps which are directly impacted by use of the prescription lens. The prescription lens compensation beneficially ensures at least one of: accuracy and sufficiency of the gaze-tracking data (for accurate determination of gaze direction and implementation of various functionalities dependent thereon), high perceived visual quality of the extended-reality images, precise physical settings (for immersion, realism, comfort, and convenience). The method is simple, can be implemented easily, and can be executed quickly (for example, in real time). The system described herein is easy to use, and the at least one processor is easily configurable to execute steps of the method.

Throughout the present disclosure the term "prescription lens" refers to an optical component that is specially designed to correct a vision problem of a user. Examples of such a vision problem include, but are not limited to near-sightedness (i.e., myopia), far-sightedness (i.e., hypermetropia), astigmatism, or presbyopia. The prescription lens is named so, since it is customized according to the user's prescription, for effectively correcting the user's vision problem. Notably, the prescription lens has at least one optical power, which enables the correction of the vision problem. A given optical power could be a positive optical power, a negative optical power, or a zero optical power. Optionally, the prescription lens has at least one coating applied thereon. The at least one coating enhances durability and visual performance of the prescription lens. The at least one coating may include one or more of an anti-reflective coating, an anti-blue screen coating, a scratch-resistant coating, a moisture-resistant coating, a dust-resistant coating, and the like. It will be appreciated that the at least one coating is applied during and/or after manufacturing the prescription lens, so information indicative of the at least one coating is available with a manufacturer of the prescription lens. A prescription lens insert may optionally be implemented as the prescription lens arranged (i.e., encased) in a frame. The frame protects the prescription lens, and enables ease of attachment or detachment to/from the display apparatus.

Throughout the present disclosure, the term "display apparatus" refers to a specialized equipment that is configured to present the extended-reality (XR) images to the user when the display apparatus in operation is worn by the user on his/her head. The display apparatus is a head-mounted device (for example, such as an XR headset, a pair of XR glasses, and the like) that is operable to present a scene of an XR environment to the viewer. Commonly, the "display apparatus" may be referred to as "head-mounted display (HMD) device". Throughout the present disclosure, the term "extended-reality" encompasses virtual reality (VR), augmented reality (AR), mixed reality (MR), and the like.

It will be appreciated that some display apparatuses do not support eyeglasses or provide automatic correction for vision problems, and in such cases, the user attaches the prescription lens to the display apparatus when using the display apparatus. The attachment of the prescription lens to the display apparatus can be done in various ways including, but not limited to, insertion of the prescription lens into a slot in the display apparatus, clipping of the prescription lens with the display apparatus, magnetic attachment of the prescription lens with the display apparatus, and attaching a modular component that includes the prescription lens, to the display apparatus.

The step of detecting when the prescription lens is attached to the display apparatus is performed automatically, so as to enable automatic compensation corresponding to the prescription lens. Notably, in this regard, said detection also encompasses identifying the prescription lens, as the compensation is to be applied accordingly. Since the prescription lens has optical properties which impact how the user would perceive the XR images presented by the display apparatus, how various functionalities are implemented in the display apparatus, and the like, a quick and an accurate detection of attachment of the prescription lens is importantly performed by the method to ensure corresponding optimization of the user's viewing experience. In an embodiment, the prescription lens is detected to be attached to the display apparatus when a detectable element of the prescription lens is detected by at least one detector that is arranged in the display apparatus. The detectable element of the prescription lens is detected by the at least one detector when the detectable element (and the prescription lens) is present in a detection space of at least one detector. In operation, the at least one detector may continuously monitor its detection space for presence of detectable elements. Herein, the term "detector" refers to a sensor which is capable of identifying the detectable element, and the term "detectable element" refers to a component or a marker that is capable of being detected using the detector. A technical effect of employing the detectable element and the at least one detector for detecting the attachment of the prescription lens to the display apparatus is that such detection happens automatically and reliably.

Optionally, the detectable element is one of: a quick response code, a radio frequency identification chip, a near field communication chip, and wherein the at least one detector is one of: a quick response code reader, a radio frequency identification reader, a near field communication-enabled reader. Such implementations of the detectable element and the at least one detector are easy to manufacture, easy to integrate with the prescription lens and the display apparatus respectively, cost effective, scalable for mass production, durable, and reliable. A technical effect of employing quick response (QR) code, radio frequency identification (RFID), and near field communication (NFC) technologies is that such technologies enable reliable, quick (almost instantaneous) and automatic detection of the attachment of the prescription lens to the display apparatus. Moreover, the prescription lens is also accurately identified using such detectable elements.

It will be appreciated that the detectable element may be pasted on the prescription lens, embedded into the prescription lens, embedded into a frame of the prescription lens, attached to the prescription lens, attached to the frame of the prescription lens, or similar. Such incorporation of the detectable element with respect to the prescription lens can be done at a time of manufacturing the prescription lens. Furthermore, the at least one detector may be placed at one or more locations in the display apparatus, according to a design of the display apparatus and a pose at which the prescription lens is expected to be attached to the display apparatus. For example, the quick response code reader may comprise a camera that, upon capturing an image of the quick response code embedded into the prescription lens, detects the attachment of the prescription lens and the display apparatus. Such a camera could be a camera of the gaze-tracking system of the display apparatus.

Optionally, when the at least one detector is the RFID reader or the NFC reader, the display apparatus also has arranged therein an antenna that is configured to generate a radio frequency field to energize the RFID chip or the NFC chip, and to receive a signal comprising data stored in the RFID chip or the NFC chip, upon said energizing. The antenna may optionally be integrated into the RFID reader or the NFC reader. Optionally, the data stored in the RFID chip or the NFC chip includes one or more of: a serial number, a manufacturer, a weblink to technical data, of the prescription lens. Said data beneficially indicates the identity of the prescription lens.

Additionally or alternatively, in an embodiment, the prescription lens is detected to be attached to the display apparatus using a sensor arranged in the display apparatus. In this regard, sensor data collected by the sensor may not necessarily be indicative of an identity of the prescription lens. Such a sensor could be a simple sensor such as a magnetic sensor, a switch, a weight sensor, or similar, which only detects attachment and detachment of the prescription lens with the display apparatus.

Upon the detection of the attachment of the prescription lens to the display apparatus, the metadata associated with the prescription lens is automatically obtained, so that the metadata can be utilized to assess a compatibility of the prescription lens with the display apparatus. The "metadata" associated with the prescription lens refers to data that provides information about at least one of: specifications of the prescription lens, properties of the prescription lens, user-related attributes of the prescription lens, compatibility of the prescription lens with the display apparatus, or similar.

Optionally, the step of obtaining the metadata associated with the prescription lens comprises at least one of:

- retrieving the metadata from a second data repository whereat the metadata is stored;
- receiving an input indicative of the metadata via the display apparatus and/or an accessory of the display apparatus, the input being provided by a user of the prescription lens.

In this regard, the metadata may be pre-stored in the second data repository and thus may be retrieved therefrom, and/or the metadata may be procured specially from the user. Such manner(s) of obtaining the metadata are reliable, easy to implement, and effectively enable an accurate determination of the compatibility of the prescription lens with the display apparatus.

The second data repository may, for example, be one of: a data repository that is associated with the manufacturer of the prescription lens, a shared data repository that is shared between the manufacturer of the display apparatus and the manufacturer of the prescription lens, a data repository associated with the manufacturer of the display apparatus, a cloud-based data repository, or similar. Optionally, the manufacturer of the prescription lens stores the metadata at the second data repository. Said manufacturer may generate the metadata using manufacturing records, manufacturing plans, measurement data, testing data, prescription inputs, and the like.

The user may provide the input indicative of the metadata via the display apparatus by inputting the metadata using an input element provided on the display apparatus. The input element may be a touch panel (for example having a virtual keyboard provided thereon), buttons, a rotary knob, a microphone, or similar. Additionally, or alternatively, the user may provide the input indicative of the metadata via the accessory of the display apparatus. Examples of the accessory of the display apparatus include, but are not limited to, a keyboard, a mouse, a user-interaction controller, a joystick, a console, a computing device (such as a computer, a tablet, a smartphone, or similar), and a wearable device.

Optionally, the metadata associated with the prescription lens comprises at least one of: an identifier, a type, an optical power, a lens profile, a size, a thickness, a shape, a coating, optical properties, a vendor, a manufacturer, an identity of a user, of the prescription lens. The optical properties of the prescription lens may comprise one or more of: a refractive index, an abbe value, light transmission, photochromic properties, polarization, of the prescription lens. Optionally, the metadata further comprises at least one of: details of the prescription, a material, a weight, an identifier of the coating, a centre thickness, a surface geometry, a user-related attribute, of the prescription lens. The user-related attribute of the prescription lens comprises the at least one optical power of the prescription lens and may also comprise at least one of: details of the prescription, an interpupillary distance, an age, eye health history, of the user. It will be appreciated that such metadata enables an accurate and objective determination of the compatibility of the prescription lens with the display apparatus.

Furthermore, optionally, the metadata further comprises a reference code to an address where the at least one compensatory parameter corresponding to the prescription lens is stored. The reference code may, for example, be a weblink, or a web-address.

The obtained metadata is compared with (i.e., matched against) metadata of each prescription lens belonging to the given set of prescription lenses that are pre-known to be compatible with the display apparatus. If a match is found upon said comparison, the prescription lens is determined to belong to the given set and is thus determined to be compatible with the display apparatus. It will be appreciated that the given set of prescription lenses that are pre-known to be compatible with the display apparatus is pre-determined by the manufacturer of the display apparatus and/or the manufacturer of the prescription lens. Optionally, information indicative of the given set of prescription lenses and the metadata of the prescription lenses of the given set are pre-stored at the first data repository. Such information may be updated regularly, or intermittently to maintain an up-to date record of the given set of prescription lenses.

Upon determining that the prescription lens belongs to the given set of prescription lenses, the at least one compensatory parameter corresponding to the prescription lens is obtained in order to enable the automatic compensation for the optical effects of the prescription lens, in an effective and accurate manner. In particular, the at least one compensatory parameter is used by the at least one processor of the display apparatus, to implement the prescription lens compensation. The term "compensatory parameter" refers to a parameter (i.e., a setting) that is adjusted in order to correct or counterbalance the optical effects of the prescription lens. Furthermore, the phrase "obtain the at least one compensatory parameter corresponding to the prescription lens" means that a value of the at least one compensatory parameter which is expected to correct or counterbalance the optical effects of the prescription lens, is obtained.

Optionally, one or more compensatory parameters for each prescription lens amongst the given set of prescription lenses is pre-determined, based on the metadata of the prescription lenses of the given set and a pre-known attachment information that is indicative of a manner in which each prescription lens is to be attached to the display apparatus. Such determining may be performed at a product development stage during manufacturing of the display apparatus. It will be appreciated that new compensatory parameter(s) may be added and/or existing compensatory parameters may be updated (i.e., modified) with subsequent software and/or firmware updates of the display apparatus. The at least one compensatory parameter corresponding to the prescription lens is obtained from amongst said one or more compensatory parameters. Optionally, the method further comprises:

- estimating how the optical effects of each prescription lens amongst the given set of the prescription lenses would adversely impact a usage experience of the display apparatus, based on the metadata of the prescription lenses of the given set, and the pre-known attachment information;
- identifying one or more parameters which when adjusted, counterbalance the adverse impact of the optical effects on the usage experience, for each prescription lens amongst the given set of the prescription lenses; and
- determining that value of the one or more parameter which minimizes the adverse impact of the optical effects on the usage experience, for each prescription lens amongst the given set of the prescription lenses, as at least one compensatory parameter for said prescription lens.

In this regard, the at least one processor of the display apparatus or any other processor associated with the display apparatus can be configured to perform the above-mentioned processing steps. Moreover, said processing steps can be implemented using at least one of a simulation model, an artificial intelligence-based model, or similar. The one or more compensatory parameters for each prescription lens amongst the given set of prescription lenses may be embedded into a firmware of the display apparatus.

Optionally, the first data repository has stored thereat a comprehensive dataset indicative of the one or more compensatory parameters corresponding to each prescription lens amongst the set of prescription lenses that are pre-known to be compatible with the display apparatus. The first data repository may, for example, be one of: the data repository associated with the manufacturer of the display apparatus, the shared data repository that is shared between the manufacturer of the display apparatus and the manufacturer of the prescription lens, the cloud-based data repository, or similar. The first data repository and the second data repository may be fully integrated, may be partially-integrated, or may be fully separate from each other. It will be appreciated that the comprehensive dataset indicative of the one or more compensatory parameters may be updated as newer prescription lenses, that are compatible with the display apparatus, are developed.

The at least one compensatory parameter that is obtained, is employed for implementing the prescription lens compensation, so that adverse impacts of the optical effects of the prescription lens on one or more functionalities associated with the usage experience of the display apparatus are mitigated or minimized to the extent that is feasible, and/or physical setting(s) of the display apparatus are adjusted, to provide a high-quality usage experience of the display apparatus. The prescription lens compensation comprises implementation of one or more processing steps, which enable the display apparatus to adapt to the prescription lens for providing said high-quality usage experience.

Furthermore, when the at least one of: the gaze-tracking data, the extended-reality images to be displayed by the display apparatus, is processed by employing the at least one compensatory parameter, it enables at least one of: accurate working of a gaze-tracking functionality, provision of highest feasible visual quality in an extended-reality viewing experience, by the display apparatus. Such processing involves software-based compensation (i.e., a compensatory effect corresponding to the prescription lens is applied digitally), and is implemented by the at least one processor of the display apparatus.

Moreover, when the at least one physical setting of the display apparatus is adjusted by employing the at least one compensatory parameter, it enables physical adaptation of the display apparatus for provision of at least a highest feasible visual quality in the extended-reality viewing experience. Such adjustment involves at least hardware-based compensation (i.e., a compensatory effect corresponding to the prescription lens is applied physically), and a control signal for implementing said compensation is generated by the at least one processor of the display apparatus.

Optionally, the step of implementing the prescription lens compensation also employs the metadata associated with the prescription lens. The metadata may provide a context of how accuracy of the gaze-tracking data, perceived visual quality of the XR images, and/or the physical settings of the display apparatus, are impacted by the prescription lens, and thus may beneficially provide useful insight for implementing the prescription lens compensation. For example, the shape of the prescription lens may be used to understand how a non-linear permanent error in the gaze-tracking data exaggerates towards peripheral edges, and thus the gaze-tracking data may be processed accordingly to rectify such error. It will be appreciated that errors in the gaze-tracking data may occur anywhere, depending on a hardware architecture of the gaze-tracking system, so the gaze-tracking data may be processed to rectify all such errors. For example, the errors in the gaze-tracking data could be top-bottom area errors, bottom-top area errors, and the like.

Optionally, the at least one compensatory parameter comprises at least one of: a gaze-tracking parameter, an image processing parameter, a physical parameter of the display apparatus. A technical effect of the at least one compensatory parameter comprising at least one of the aforesaid parameters is that such parameters, when employed, enable accurate and effective prescription lens compensation, for provision of a high visual quality and immersion in the XR images presented by the display apparatus, and/or an adaptive and an intuitive usage experience of the display apparatus.

The "gaze-tracking parameter" refers to any parameter that impacts how the gaze-tracking functionality is implemented in the display apparatus. Typically, the attachment of the prescription lens to the display apparatus can impact how the user's gaze is tracked, since the optical properties of the prescription lens may cause one or more of distortion, obstruction of the gaze-tacking camera's field of view, misalignment, unwanted reflections and/or glare, dimming and the like. As a result, the gaze-tracking data may be incomplete or error prone. When such gaze-tracking data is used to determine a gaze direction of the user's eye, said gaze direction would also be inaccurate. In order to mitigate such potential issues, the gaze-tracking parameter is beneficially employed for implementing the prescription lens compensation, so that the gaze-tracking parameter enables at least partial compensation for the optical effects of the prescription lens and/or physical interference of the prescription lens with the gaze-tracking system, in the gaze-tracking functionality. In this regard, the gaze tracking parameter may enable processing of the gaze-tracking data by imputing missing values and/or rectifying errors, in the gaze-tracking data.

The "image processing parameter" refers to any parameter that impacts how an image processing functionality is implemented in the display apparatus. Typically, the attachment of the prescription lens to the display apparatus can impact how the user would perceive the XR images presented by the display apparatus, since the optical properties of the prescription lens may cause one or more of image distortion, field of view reduction, focus mismatch, chromatic aberration, obstruction, unwanted reflections and/or glare, distorted depth perception, blurring and/or darkening around edges of visual field, and the like. As a result, the user's perception of the XR image would be improper, unrealistic, and non-immersive. In order to mitigate such potential issues, the image processing parameter is beneficially employed for implementing the prescription lens compensation, so that the image processing parameter enables at least partial compensation for the optical effects of the prescription lens, in the image processing functionality. In this regard, the image processing parameter may enable processing of the XR images to be displayed, so as to enable a proper, high-quality, realistic and immersive perception of the XR images.

The "physical parameter of the display apparatus" refers to any parameter that impacts how a physical setting and/or a physical arrangement is implemented in the display apparatus. Typically, the attachment of the prescription lens to the display apparatus can impact the usage experience of the display apparatus, since the optical properties and arrangement of the prescription lens may cause one or more of distortion, field of view reduction, focus mismatch, chromatic aberration, obstruction, unwanted reflections and/or glare, and the like. In order to mitigate such potential issues, the physical parameter is beneficially employed for implementing the prescription lens compensation, so that the physical parameter enables at least partial compensation for the optical effects and the arrangement of the prescription lens, in the physical setting and/or the physical arrangement. In this regard, the physical parameter may enable dynamic adjustment of the at least one physical setting, to implement the physical (i.e., mechanical, or hardware-based) adaptation of the display apparatus, to provide the highest feasible visual quality in the extended-reality viewing experience.

Optionally, the gaze-tracking parameter comprises at least one of: eye relief, a pupil size magnification factor, a pupil location, an offset. Values of each of such gaze-tracking attributes directly impact sufficiency and/or accuracy of the gaze-tracking data. Therefore, a technical effect of employing at least one of such gaze-tracking attributes as the gaze-tracking parameter, is that the gaze-tracking data is correctly and adequately processed when implementing the prescription lens compensation.

The term "eye relief" refers to a distance between an eye and an exit optical element (i.e., an eyepiece) of the display apparatus. As an example, when determining the eye relief, a two-dimensional (2D) position of the eye or of a centre of an ocular surface of the eye may be employed. As another example, when determining the eye relief, a three-dimensional (3D) position of a centre of the eye may be employed, wherein an apparent shift in this 3D position is introduced by the prescription lens. The prescription lens is an additional optical element which adversely impacts factory calibration and settings of the display apparatus. By employing a pre-determined value of the eye relief for the prescription lens, the display apparatus can account for changes in a perceived eye position caused by the prescription lens and can minimize distortions or misalignments by keeping the user's eyes within an optimal tracking range, thereby reducing errors in the gaze tracking data and ensuring a correct determination of the gaze direction.

The "pupil size magnification factor" refers to how the prescription lens alters an apparent size of the pupil as seen by the gaze-tracking system. By employing a pre-determined value of the pupil size magnification factor for the prescription lens, the display apparatus can account for a perceived magnification error in the apparent size of the pupil, thereby ensuring that pupil size is interpreted correctly in the gaze-tracking data.

The "pupil location" refers to a location of the pupil's centre. Typically, the prescription lens can warp a coordinates of the pupil's centre, which adversely impacts the gaze-tracking functionality. By employing a pre-determined pupil location corresponding to an apparent pupil location for the prescription lens, the display apparatus can account for apparent shifting of the pupil location due to refraction effects of the prescription lens by adjusting the gaze-tracking data accordingly, thereby enabling accurate determination of the gaze direction. Pre-determined pupil locations corresponding to apparent pupil locations can optionally be determined using a set of pre-specified offsets (i.e., differences) corresponding to the apparent pupil locations, for the prescription lens. Moreover, the pre-determined pupil location for the prescription lens also enables automatic adjustment of the interpupillary distance (IPD). As an example, Table 1 below shows how using even a null prescription lens (i.e., a prescription lens having a zero optical power) with the display apparatus shifts the pupil location. Such shifting affects the gaze-tracking system's expected behaviour of the user's eye and requires recalibration. Using a prescription lens having a non-zero optical power changes even magnification and spatial evenness of pupil location coordinate's linear offset. All values in columns 2, 3, and 4 of Table 1 are in millimeters (mm).

TABLE 1

| Normalized co-ordinate on gaze-tracking camera sensor | Corresponding ray coordinate in the plane of user's eye without prescription lens (mm) | Corresponding ray coordinate in the plane of the user's eye with prescription lens (mm) | Difference (Error) (mm) |
|---|---|---|---|
| X: −1 | −2.7287 | −2.1259 | −0.6028 |
| Y: −1 | 10.9091 | 12.3547 | −1.4456 |
| X: −0.5 | −2.1177 | −1.5126 | −0.6051 |
| Y: −0.5 | 5.2364 | 6.6907 | −1.4543 |
| X: 0 | −1.4925 | −0.8924 | −0.6001 |
| Y: 0 | −0.7567 | 0.6294 | −1.3862 |
| X: 0.5 | −0.8521 | −0.2611 | −0.5910 |
| Y: 0.5 | −6.9087 | −5.6429 | −1.2658 |
| X: 1 | −0.2007 | 0.3780 | −0.5786 |
| Y: 1 | −12.9663 | −11.7997 | −1.1666 |

The term "offset" refers to any offset utilised in the gaze-tracking system. For example, the offset could be a linear offset of a coordinate system of the gaze-tracking system. By employing a pre-determined offset for the prescription lens, the display apparatus can account for the errors or shifts in perceived pupil position due to the optical effects of the prescription lens.

Optionally, the image processing parameter comprises at least one of: a High Dynamic Range (HDR) colour calibration parameter, a distortion correction parameter, a mura correction parameter, a chromatic aberration correction parameter, an artifact correction parameter. Values of each of such parameters directly impact the visual quality of the XR images. Therefore, a technical effect of employing at least one of such parameters as the image processing parameter is that a compensatory effect is applied to the XR images when implementing the prescription lens compensation, so that upon displaying, the XR images are perceivable with a high visual quality despite the usage of the prescription lens.

The "HDR color calibration parameter" can be employed to ensure accurate color reproduction across a wide range of brightness and color levels on HDR displays, allowing the HDR range to be properly perceivable when viewing the XR images through the prescription lens. The display apparatus may comprise one or more of such HDR displays for displaying the XR images. Examples of the HDR colour calibration parameter may include, but are not limited to, a peak luminance, a black level, a white point, a colour gamut, an electro-optical transfer function, a tone-mapping parameter, a dynamic range. As an example, the at least one coating of the prescription lens may ruin careful calibration of the transmission and reflection spectrums of lenses in the display apparatus, which are tightly specified to achieve HDR reproduction. In such case, the HDR colour calibration parameter enables in counterbalancing the impact of the at least one coating.

The "distortion correction parameter" can be employed to perform distortion correction, so as to compensate for geometric distortions which will be introduced by the prescription lens when viewing the XR images. Such geometric distortions could be a radial distortion, a tangential distortion, an image warping, and similar. Examples of the distortion correction parameter may include, but are not limited to, a distortion coefficient(s), a distortion model, a distortion profile, an image warping coefficient, a principal point offset (in case of the radial distortion), a skew (in case of the tangential distortion), a camera calibration parameter.

The "mura correction parameter" can be employed to perform mura correction for a display, such that a perception of mura artifacts is minimized or eliminated when the XR images are viewed through the prescription lens. Examples of the mura correction parameter may include, but are not limited to, a mura correction strength, a correction matrix, a look up table mapping input pixel values to corrected output pixel values according to mura correction requirements, a brightness correction parameter, a colour correction parameter, a gamma value, a spatial filtering parameter, a temporal filtering parameter.

The "chromatic aberration correction parameter" can be employed to compensate for colour distortions that may arise when the XR image would be viewed through the prescription lens. Such colour distortions (i.e., chromatic aberrations) may arise due to properties of the at least one coating which may be applied on the prescription lens. Examples of the chromatic aberration correction parameter may include, but are not limited to, chromatic aberration coefficients, a chromatic aberration model, distortion patterns for colours. As an example, distortion patterns for primary colors (i.e., separate distortion compensation for red, green and blue colours) may be employed to fix chromatic aberrations, so that these colours can be properly overlaid.

The "artifact correction parameter" can be employed to perform compensation for artifacts which can be introduced by the prescription lens when viewing the XR images. The artifacts may, for example, be lens flares, glares, and similar. Examples of the artifact correction parameter may include, but are not limited to, a noise reduction strength, a depth estimation parameter (for depth-based artifact correction), a reflection correction parameter. For example, some reflections may occur between the eyepiece of the display apparatus and prescription lens, and based on pre-known knowledge of such reflections, the reflection correction parameter can be predetermined to enable processing of the XR image such that such reflections are not imperceptible when viewing the XR image through the prescription lens. Furthermore, the reflection correction parameter may also indicate whether and how to compensate for or discard such reflections when processing the gaze-tracking data.

Optionally, the physical parameter of the display apparatus comprises at least one of: an interpupillary distance (IPD) setting, a field of view (FOV) setting, a visual experience setting, an eyepiece setting. Values of each of such physical settings directly impact the usage experience of the display apparatus. Therefore, a technical effect of employing at least one of such physical settings as the physical parameter, is that a physical compensatory adjustment (corresponding to the prescription lens) is correctly and adequately performed when implementing the prescription lens compensation.

The IPD setting may be adjusted to compensate for optical misalignment and/or distortion that may be caused by the prescription lens, so that upon compensation, display(s) of the display apparatus are properly aligned with the user's eyes to provide a visually clear, distortion-free, and strain-free viewing experience. Adjustment of the IPD setting may also facilitate an improved stereoscopic depth perception and improved HDR and colour accuracy perception. The IPD setting may, for example, be adjusted by physically changing a pose (i.e., position and/or orientation) of the display(s).

The FOV setting may be adjusted to compensate for FOV distortions that may be caused by the prescription lens. Such FOV distortions could be narrowing of FOV, warping of FOV, peripheral distortions, a tunnel vision, or similar effects. Upon compensation, the adjusted FOV setting provides a comfortable, FOV distortion-free, and immersive viewing experience with nil or minimal distortion perception. The FOV setting may be adjusted by adjusting the eye relief (for example by moving the eyepiece closer to/away from the user's eye), moving the display(s) of the display apparatus, or similar.

The visual experience setting may be adjusted to compensate for the adverse visual effects that may be caused by the prescription lens. For example, the visual experience setting may be one or more of a brightness setting, a contrast setting, a colour balance setting, a sharpness setting, a focus setting, or similar. Upon compensation, the adjusted visual experience setting provides a comfortable, realistic, immersive, and high-quality viewing experience. The visual experience setting can be adjusted by adjusting a setting of the display(s) of the display apparatus, moving optical components of the display apparatus, or similar.

The "eyepiece setting" is a distance between eyepiece and the user's eye. The prescription lens would impact an optical path of light traveling therethrough, and thus the eyepiece setting can be adjusted to compensate for such impact. This enables provision of a distortion-free viewing experience.

Optionally, when it is determined that the prescription lens does not belong to the given set of prescription lenses, the method further comprises at least one of:

- providing, on a display of the display apparatus, a communication indicating potential performance deterioration due to use of incompatible prescription lens;
- providing, on at least one of: the display apparatus, an accessory of the display apparatus, a software application executing on the display apparatus or the accessory, a prompt for providing an input indicative of the metadata.

In this regard, the prescription lens may be partially or fully incompatible with the display apparatus. When an incompatible prescription lens is attached to the display apparatus, the communication indicating potential performance deterioration may be provided on the display of the display apparatus, to notify (i.e., inform) the user of such incompatibility. Upon viewing said communication, the user may remove the prescription lens and use another prescription lens that is compatible with the display apparatus, or halt usage of the display apparatus. The communication indicating potential performance deterioration may also include an instruction to detach the incompatible prescription lens from the display apparatus. Additionally, or alternatively, when an incompatible prescription lens is attached to the display apparatus, the prompt for providing the input indicative of the metadata is provided, to obtain the metadata of the incompatible prescription lens from the user. Such metadata is used by the display apparatus to at least partially compensate for the optical performance of the incompatible prescription lens, to the extent that is feasible, for reducing the potential performance deterioration. The input is provided by the user, via input element(s) of the display apparatus and/or the accessory. For example, when the incompatible prescription lens is attached to the display apparatus, the prompt may be provided on the software application executing on a smartphone or a computer coupled to the display apparatus, in the form of questionnaire for receiving the metadata of the incompatible prescription lens.

It will be appreciated that using the incompatible prescription lens with the display apparatus can lead to several issues such as blurred or distorted vision, visual discomfort, reduced immersion or realism, eye strain and fatigue, or dizziness. Therefore, optionally providing the communication indicating potential performance deterioration and/or the prompt for providing the input indicative of the metadata, enables in avoiding such issues, or if such issues are unavoidable, then in at least reducing a magnitude of such issues.

Optionally, the metadata associated with the prescription lens comprises an identity of a user of the prescription lens, and wherein the method further comprises employing at least one personal setting corresponding to the user, when executing a software application on the display apparatus, wherein the at least one personal setting corresponding to the user is pre-stored at a third data repository. Such automatization to personal preference(s) of any user, upon recognizing the user via the metadata of their prescription lens, enhances the user's usage experience of the display apparatus (as it saves the user's time and energy that are typically spent in repeatedly adjusting conventional display apparatuses to their preference, reduces decision fatigue, provides consistent settings across multiple uses, and the like). In this way, the metadata of the prescription lens directly facilitates enhancing the user's usage experience, by enabling employment of the at least one personal setting that is customized to the user's preference. Furthermore, this enables a same display apparatus to be effectively and seamlessly utilized by multiple users, since the at least one personal setting for each user are automatically applied when the user's identity is obtained.

In this regard, the identity of the user may be in the form of a name, a user identification code, or similar. Furthermore, the at least one "personal setting" corresponding to the user encompasses at least one of: a setting that is prespecified by the user as the user's preferred setting, a setting that has been previously-used by the user, a setting that is used by other users having a similar prescription lens as the user. Moreover, the software application could be an XR application and/or a basic software application for configuring and/or for performing basic setup and use of the display apparatus. The XR application, when executed, may perform one or more of generation of XR images, processing of XR images, controlling displaying of XR images, playing audio corresponding to the XR images, and the like. For example, the at least one personal setting may be a setting that skips one or more setup procedures (such as automatic IPD adjustment) of the display apparatus. As another example, the at least one personal setting may be a setting that implements one or more setup procedures in the display apparatus. As yet another example, the at least one personal setting may be a setting that controls one or more features (such as a volume) of the XR application. Notably, the third data repository may be partially or fully integrated with any of: the first data repository, the second data repository, or may be fully separate from them.

Optionally, the at least one personal setting comprises at least one of: a gaze-tracking calibration setting, a face calibration setting, a display apparatus best-fit setting, a volume setting, an interpupillary distance (IPD) setting, a field of view (FOV) setting, a visual experience setting, a setting of a device to which the display apparatus is coupled. The device could be, for example, a smartphone, a desktop computer, a laptop computer, a tablet computer, a gaming console, an internet-of-things enabled device, or similar. A technical effect of employing such settings as the at least one personal setting is that they enable automatic user-specific customization of one or more functionalities in the display apparatus. As a result, the one or more functionalities are implemented quickly and accurately.

In this regard, the gaze-tracking calibration setting may be employed to automatically perform at least one of: determine the IPD of the user as a previously-measured IPD of the user, utilise pre-identified features of the user's eyes and/or pre-known eye information in a gaze-tracking algorithm, use a calibration pattern that is preferred by the user, account for pre-known environmental factors impacting gaze-tracking, and the like, for ensuring quick and accurate implementation of the gaze-tracking functionality corresponding to the user. It will be appreciated that in respect of the at least one personal setting, when something is said to be "pre-known", it means that something is previously-used, previously-specified, previously-determined, previously-identified, or similar.

Furthermore, the face calibration setting may be employed to automatically utilise a pre-known face contour, pre-known facial features, pre-known facial characteristics, and the like, of the user, when calibrating the display apparatus according to the user's face. Moreover, the display apparatus best-fit setting may be employed for assisting the user in adjusting the display apparatus on the user's head such that a present fit of the display apparatus matches the display apparatus best-fit setting (for example, to match a comfort of a previous use). In this regard, the display apparatus best-fit setting is pre-specified by the user, and may prompt the user on how to position the display apparatus with respect to the user's head and/or face.

Furthermore, the volume setting may be employed to set a volume level to be equal to a previously-used volume level by the user. Moreover, the IPD setting may be employed to automatically adjust pose and/or properties of one or more components of the display apparatus to align with a pre-known IPD of the user, for ensuring visual clarity and comfort.

Furthermore, the FOV setting may be employed to automatically adjust the eye relief, the pose of the display(s) of the display apparatus, or similar, to match a pre-known FOV setting for the user. Moreover, the visual experience setting may be employed to automatically adjust one or more settings, to provide a user-specific immersive, and high-quality viewing experience. Furthermore, the setting of the device to which the display apparatus is coupled may be employed to adjust one or more features of said device to a pre-known value associated with the user. For example, the setting of the device may be a do-not-disturb setting which may be set to 'activated' when the software application is executing to set up the display apparatus.

Optionally, the method further comprises checking whether the prescription lens is attached to the display apparatus, when at least one of the following occurs: the display apparatus is switched on, the display apparatus is restarted, the display apparatus wakes up from a power-saving operational mode, the display apparatus switches from one display session to another display session. In this regard, said checking is specially performed to ascertain whether the prescription lens is attached to the display apparatus, automatically upon occurrence of at least one of the aforesaid conditions. It will be appreciated that prescription lenses can be attached, detached, or swapped, prior to or during such conditions. For example, the prescription lenses may be attached prior to switching on the display apparatus, the prescription lenses may be swapped when a different user starts using the display apparatus, and the like. Implementing said checking upon occurrence of such conditions enables the display apparatus to dynamically adapt to such adjustments of the prescription lenses. When upon said checking it is detected that the prescription lens is attached to the display apparatus, the previously-described steps of the method are implemented.

It will be appreciated that said checking may only detect whether the prescription lens is attached to the display apparatus, and may not necessarily identify the prescription lens. Said checking may be performed by processing sensor data collected by the sensor (described earlier) that is optionally arranged in the display apparatus. Optionally, the power-saving operational mode is one of: a sleep mode, a hibernation mode, a power-saver mode. Such power-saving operational modes are well-known in the art.

Optionally, the method further comprises:

- detecting when the prescription lens is detached from the display apparatus; and
- upon said detection, disabling the prescription lens compensation and operating the display apparatus by employing default settings, wherein said operating comprises one or more of:
  - processing the at least one of: the gaze-tracking data, the extended-reality images to be displayed by the display apparatus,
  - adjusting the at least one physical setting of the display apparatus.

Optionally, in this regard, the prescription lens is detected to be detached from the display apparatus when at least one of the following occurs: the at least one detector fails to detect the detectable element, the sensor data collected by the sensor is indicative of said detachment. When the prescription lens is detached from the display apparatus, the optical effects of the prescription lens no longer impact a usage experience of the display apparatus and thus the prescription lens compensation is no longer required. Therefore, the display apparatus is operated using the default settings which correspond to a default prescription-lens free operation of the display apparatus. In this case, the at least one of: the gaze-tracking data, the XR images, may be processed in a default manner without compensating for the optical effects of the prescription lens. Additionally, or alternatively, the at least one physical setting may be adjusted to its default state. A technical effect of employing the default settings is that it enables an accurate and high-quality viewing experience to be provided even when the display apparatus is used without the prescription lens.

It will be appreciated that the user may wear different prescription lenses for different eyes. Furthermore, the display apparatus typically has one dedicated optical chamber per eye. Therefore, with respect to all the aforementioned embodiments, the steps of the method (for example, such as the detection of the attachment of the prescription lens to the display apparatus, the compatibility check for the prescription lens, and the corresponding implementation of the prescription lens compensation) may be executed separately per eye/per optical chamber.

The present disclosure also relates to the display apparatus as described above. Various embodiments and variants disclosed above, with respect to the aforementioned method, apply mutatis mutandis to the display apparatus.

The gaze-tracking system could be implemented as at least one of:

(i) contact lenses with sensors (for example, such as a microelectromechanical systems (MEMS) accelerometer and a gyroscope employed to detect a movement and an orientation of a given eye, and/or electrodes employed to measure electrooculographic (EOG) signals generated by the movement of the given eye), (ii) at least one infrared (IR) light source and at least one IR camera, wherein the at least one IR light source is employed to emit IR light towards the given eye, while the at least one IR camera is employed to determine a position of a pupil of the given eye with respect to at least one glint (formed due to a reflection of the IR light off an ocular surface of the given eye), (iii) at least one camera, employed to determine a position of the pupil of the given eye with respect to corners of the given eye, and optionally, to determine a size and/or a shape of the pupil of the given eye, (iv) a plurality of light field sensors employed to capture a wavefront of light reflected off the ocular surface of the given eye, wherein the wavefront is indicative of a geometry of a part of the ocular surface that reflected the light, (v) a plurality of light sensors and optionally, a plurality of light emitters, wherein the plurality of light sensors are employed to sense an intensity of light that is incident upon these light sensors upon being reflected off the ocular surface of the given eye, and to determine a direction from which the light is incident upon these light sensors.

The at least one processor is implemented as hardware, software, firmware, or a combination of these. The at least one processor implements the steps of the method, for enabling the display apparatus to automatically implement the prescription lens compensation. The at least one processor is communicably coupled to the first data repository, and may optionally also be communicably coupled to the second data repository and/or the third data repository. The at least one processor may also be coupled to the accessory of the display apparatus. It will be appreciated that the at least one processor of the display apparatus may be arranged in at least one of: the display apparatus, a device to which the display apparatus is coupled. For example, the display apparatus may be tethered to a computer, so in this case, the at least one processor of the display apparatus may be a processor of the computer. This means that in this case, the prescription lens compensation is performed outside of the display apparatus itself, at the computer.

Optionally, the system further comprises at least one of: the first data repository, the second data repository, the third data repository. Optionally, the system further comprises at least one of: the accessory of the display apparatus, the device to which the display apparatus is coupled. In this regard, one or more of the processing steps of the method may be performed by a processor of the accessory and/or the device, thus reducing a computational burden on the at least one processor.

Optionally, in the system, the display apparatus further comprises at least one detector arranged therein, the at least one detector being configured to detect a detectable element of the prescription lens. The at least one detector enables automatic and reliable detection of the attachment of the prescription lens to the display apparatus.

DETAILED DESCRIPTION OF THE DRAWINGS

Referring to FIG. 1, illustrated are steps of a method, in accordance with an embodiment of the present disclosure. At step 102, it is detected when a prescription lens is attached to a display apparatus. At step 104, metadata associated with the prescription lens is obtained, upon said detection (of the step 102). At step 106, it is determined whether the prescription lens belongs to a given set of prescription lenses that are pre-known to be compatible with the display apparatus, based on the obtained metadata. At step 108, at least one compensatory parameter corresponding to the prescription lens is obtained from a first data repository, when it is determined that the prescription lens belongs to the given set of prescription lenses (at the step 106). At step 110, prescription lens compensation is implemented by employing the at least one compensatory parameter, wherein the prescription lens compensation comprises one or more of: processing at least one of: gaze-tracking data, extended-reality images to be displayed by the display apparatus, adjusting at least one physical setting of the display apparatus. When at step 106 it is determined that the prescription lens does not belong to the given set of prescription lenses, then at step 112, at least one of the following occurs: a communication indicating potential performance deterioration due to use of incompatible prescription lens is provided on a display of the display apparatus, a prompt for providing an input indicative of the metadata is provided on at least one of: the display apparatus, an accessory of the display apparatus, a software application executing on the display apparatus or the accessory.

The aforementioned steps are only illustrative and other alternatives can also be provided where one or more steps are added, one or more steps are removed, or one or more steps are provided in a different sequence without departing from the scope of the claims.

Figure 2:
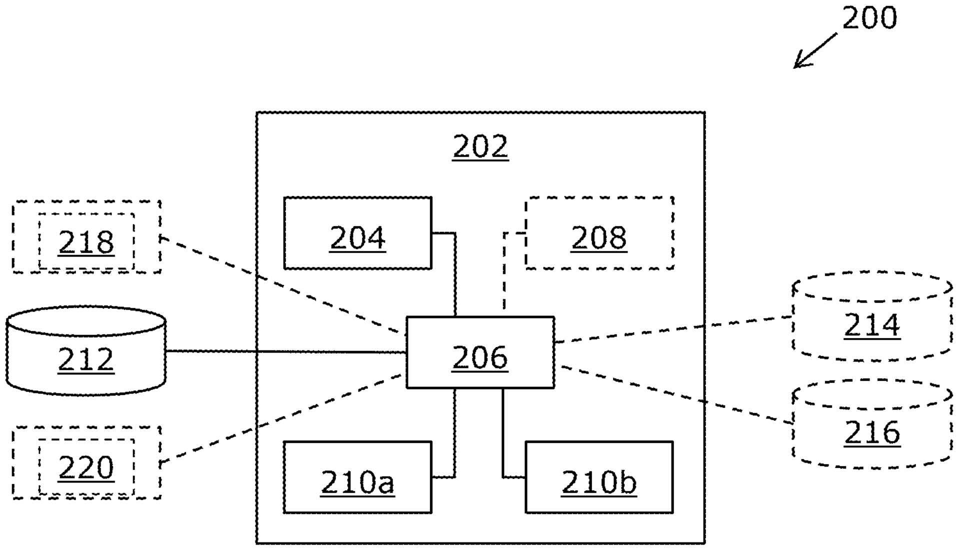
FIG. 2 illustrates a block diagram architecture of a system, in accordance with an embodiment of the present disclosure.

Referring to FIG. 2, illustrated is a block diagram architecture of a system 200, in accordance with an embodiment of the present disclosure. The system 200 comprises a display apparatus 202, wherein the display apparatus 202 comprises a gaze tracking system 204 and at least one processor (for example, depicted as a processor 206). The processor 206 is communicably coupled to the gaze tracking system 204. Optionally, the display apparatus 202 further comprises at least one detector (depicted as a detector 208) arranged therein. In this regard, the detector 208 is communicably coupled to the processor 206. The display apparatus 202 also comprises at least one display (depicted as displays 210*a* and 210*b* corresponding to a left eye and a right eye, respectively) coupled to the processor 206. The processor 206 is communicably coupled to a first data repository 212. Optionally, the processor 206 is also communicably coupled to a second data repository 214, and a third data repository 216. The processor 206 is optionally also coupled to at least one of: an accessory 218 of the display apparatus 202, a device 220. The processor 206 is configured to perform various operations, as described earlier with respect to the aforementioned first aspect.

It may be understood by a person skilled in the art that the FIG. 2 includes a simplified block diagram architecture of the system 200 for sake of clarity, which should not unduly limit the scope of the claims herein. It is to be understood that the specific implementation of the system 200 is provided as an example, and is not to be construed as limiting it to specific numbers or types of components. The person skilled in the art will recognize many variations, alternatives, and modifications of embodiments of the present disclosure.

Figure 3:
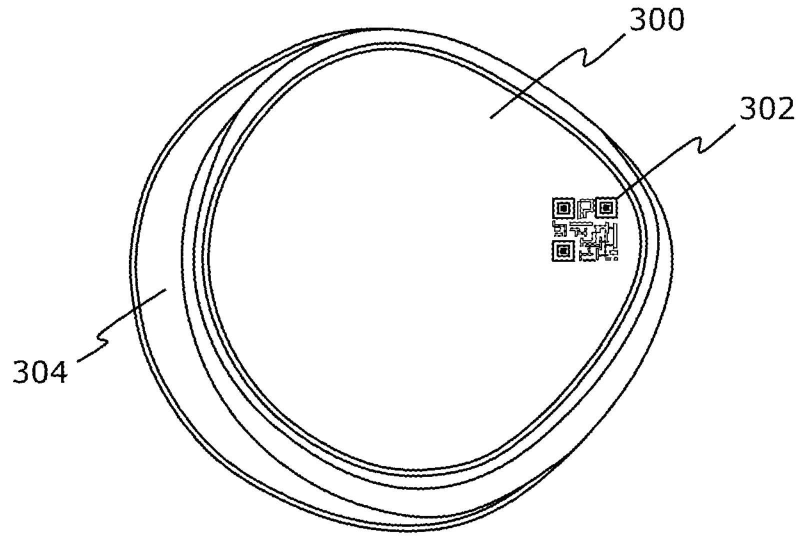
FIG. 3 illustrates an exemplary schematic implementation of a prescription lens, in accordance with an embodiment of the present disclosure.

Referring to FIG. 3, illustrated is an exemplary schematic implementation of a prescription lens 300, in accordance with an embodiment of the present disclosure. The prescription lens 300 comprises a detectable element 302. The detectable element 302 shown herein is, for example, a quick response code. The prescription lens 300 may optionally be arranged in a frame 304.

FIG. 3 is merely an example, which should not unduly limit the scope of the claims herein. A person skilled in the art will recognize many variations, alternatives, and modifications of embodiments of the present disclosure. For example, the detectable element 302 may be arranged in the frame 304 of the prescription lens 300.

Figure 4:
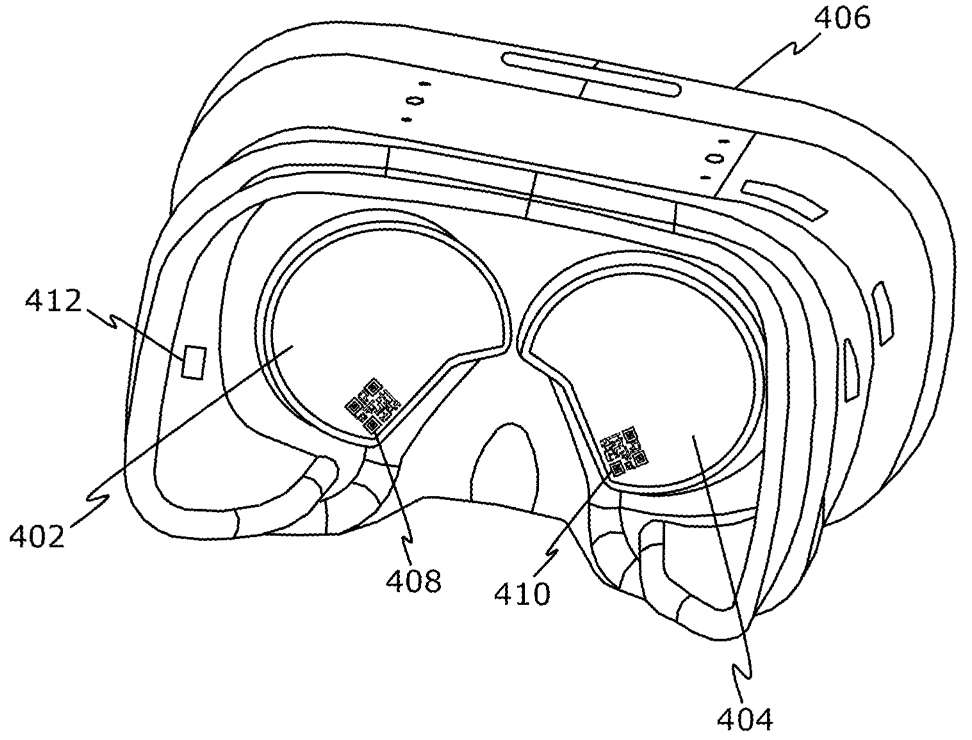
FIG. 4 illustrates an attachment of prescription lenses to a display apparatus, in accordance with an embodiment of the present disclosure.

Referring to FIG. 4, illustrated is an attachment of prescription lenses 402 and 404 to a display apparatus 406, in accordance with an embodiment of the present disclosure. The prescription lenses 402 and 404 are shown, for example, to be snug-fit attached to the display apparatus 406. Moreover, the prescription lens 402 is shown to comprise a detectable element 408, and the prescription lens 404 is shown to comprise a detectable element 410. Furthermore, the display apparatus 406 is shown to comprise at least one detector (depicted as a detector 412) arranged to detect the detectable elements 408 and 410.

FIG. 4 is merely an example, which should not unduly limit the scope of the claims herein. A person skilled in the art will recognize many variations, alternatives, and modifications of embodiments of the present disclosure.

The invention claimed is:

1. A method comprising:

detecting when a prescription lens is attached to a display apparatus;

obtaining metadata associated with the prescription lens, upon said detection;

determining whether the prescription lens belongs to a given set of prescription lenses that are pre-known to be compatible with the display apparatus, based on the obtained metadata;

when it is determined that the prescription lens belongs to the given set of prescription lenses, obtaining at least one compensatory parameter corresponding to the prescription lens from a first data repository, wherein the at least one compensatory parameter comprises a gaze-tracking parameter, and wherein the gaze-tracking parameter comprises a pupil size magnification factor; and implementing prescription lens compensation by employing the at least one compensatory parameter, wherein the prescription lens compensation comprises one or more of:

processing at least one of: gaze-tracking data, extended-reality images to be displayed by the display apparatus, adjusting at least one physical setting of the display apparatus.

2. The method of claim 1, wherein the prescription lens is detected to be attached to the display apparatus when a detectable element of the prescription lens is detected by at least one detector that is arranged in the display apparatus.

3. The method of claim 2, wherein the detectable element is one of: a quick response code, a radio frequency identification chip, a near field communication chip, and wherein the at least one detector is one of: a quick response code reader, a radio frequency identification reader, a near field communication-enabled reader.

4. The method of claim 1, wherein the step of obtaining the metadata associated with the prescription lens comprises at least one of:

retrieving the metadata from a second data repository whereat the metadata is stored;

receiving an input indicative of the metadata via the display apparatus and/or an accessory of the display apparatus, the input being provided by a user of the prescription lens.

5. The method of claim 1, wherein the metadata associated with the prescription lens comprises at least one of: an identifier, a type, an optical power, a lens profile, a size, a thickness, a shape, a coating, optical properties, a vendor, a manufacturer, an identity of a user, of the prescription lens.

6. The method of claim 1, wherein the at least one compensatory parameter comprises at least one of: an image processing parameter, a physical parameter of the display apparatus.

7. The method of claim 6, wherein the image processing parameter comprises at least one of: a High Dynamic Range (HDR) colour calibration parameter, a distortion correction parameter, a mura correction parameter, a chromatic aberration correction parameter, an artifact correction parameter.

8. The method of claim 6, wherein the physical parameter of the display apparatus comprises at least one of: an interpupillary distance (IPD) setting, a field of view (FOV) setting, a visual experience setting, an eyepiece setting.

9. The method of claim 1, wherein the gaze-tracking parameter further comprises at least one of: eye relief, a pupil location, an offset.

10. The method of claim 1, wherein when it is determined that the prescription lens does not belong to the given set of prescription lenses, the method further comprises at least one of:

providing, on a display of the display apparatus, a communication indicating potential performance deterioration due to use of incompatible prescription lens;

providing, on at least one of: the display apparatus, an accessory of the display apparatus, a software application executing on the display apparatus or the accessory, a prompt for providing an input indicative of the metadata.

11. The method of claim 1, wherein the metadata associated with the prescription lens comprises an identity of a user of the prescription lens, and wherein the method further comprises employing at least one personal setting corresponding to the user, when executing a software application on the display apparatus, wherein the at least one personal setting corresponding to the user is pre-stored at a third data repository.

12. The method of claim 11, wherein the at least one personal setting comprises at least one of: a gaze-tracking calibration setting, a face calibration setting, a display apparatus best-fit setting, a volume setting, an interpupillary distance (IPD) setting, a field of view (FOV) setting, a visual experience setting, a setting of a device to which the display apparatus is coupled.

13. The method of claim 1, further comprising checking whether the prescription lens is attached to the display apparatus, when at least one of the following occurs: the display apparatus is switched on, the display apparatus is restarted, the display apparatus wakes up from a power-saving operational mode, the display apparatus switches from one display session to another display session.

14. The method of claim 1, further comprising:

detecting when the prescription lens is detached from the display apparatus; and upon said detection, disabling the prescription lens compensation and operating the display apparatus by employing default settings, wherein said operating comprises one or more of:

processing the at least one of: the gaze-tracking data, the extended-reality images to be displayed by the display apparatus, adjusting the at least one physical setting of the display apparatus.

15. A system comprising a display apparatus, wherein the display apparatus comprises:

a gaze-tracking system; and at least one processor configured to:

detect when a prescription lens is attached to the display apparatus;

obtain metadata associated with the prescription lens, upon said detection;

determine whether the prescription lens belongs to a given set of prescription lenses that are pre-known to be compatible with the display apparatus, based on the obtained metadata;

when it is determined that the prescription lens belongs to the given set of prescription lenses, obtain at least one compensatory parameter corresponding to the prescription lens from a first data repository, wherein the at least one compensatory parameter comprises a gaze-tracking parameter, and wherein the gaze-tracking parameter comprises a pupil size magnification factor; and implement prescription lens compensation by employing the at least one compensatory parameter, wherein when implementing the prescription lens compensation, the at least one processor is configured to perform one or more of:

process at least one of: gaze-tracking data, extended-reality images to be displayed by the display apparatus, adjust at least one physical setting of the display apparatus.

16. A system according to claim 15, wherein the display apparatus further comprises at least one detector arranged therein, the at least one detector being configured to detect a detectable element of the prescription lens.

* * * * *